United States Patent
Kilcoin

[19]

[11] Patent Number: 5,848,622
[45] Date of Patent: Dec. 15, 1998

[54] CLOSURE DEVICE AND METHOD FOR VENTING, CANNULATING AND PRESSURIZING A VESSEL

[75] Inventor: Christopher Kilcoin, Los Altos Hills, Calif.

[73] Assignee: Argonaut Technologies Incorporated, San Carlos, Calif.

[21] Appl. No.: 897,661

[22] Filed: Jul. 21, 1997

Related U.S. Application Data

[62] Division of Ser. No. 696,423, Aug. 13, 1996.

[51] Int. Cl.⁶ .................................. B65B 1/04; B65B 3/04
[52] U.S. Cl. .................................. 141/59; 141/18; 141/50; 141/302; 215/309; 222/489
[58] Field of Search ........................... 141/59, 2, 3, 18, 141/50, 64, 66, 291, 285, 301, 302; 215/309, 276; 222/489, 479, 553, 521, 148

[56] References Cited

U.S. PATENT DOCUMENTS

| | | | |
|---|---|---|---|
| 1,346,137 | 7/1920 | Silverthorne | 222/553 |
| 4,029,473 | 6/1977 | Sharples | 23/259 |
| 4,241,018 | 12/1980 | Lang | 422/75 |
| 4,302,421 | 11/1981 | Baker | 422/64 |
| 4,332,768 | 6/1982 | Berglund | 422/63 |
| 4,563,336 | 1/1986 | McKnight | 422/240 |
| 4,671,329 | 6/1987 | Kovacevich, Jr. | 141/5 |
| 4,676,283 | 6/1987 | Caldwell | 141/4 |
| 4,867,354 | 9/1989 | Schreiber | 222/521 |
| 4,993,573 | 2/1991 | Freidel et al. | 215/309 |
| 5,259,423 | 11/1993 | Simmel et al. | 141/1 |
| 5,265,483 | 11/1993 | Farrell et al. | 73/863.86 |
| 5,297,599 | 3/1994 | Bucheli | 141/329 |
| 5,301,723 | 4/1994 | Goode | 141/82 |
| 5,425,921 | 6/1995 | Coakley et al. | 422/102 |
| 5,535,923 | 7/1996 | Fujioka | 222/148 |

FOREIGN PATENT DOCUMENTS 634222  3/1950  United Kingdom .................. 215/313

*Primary Examiner*—Steven O. Douglas
*Attorney, Agent, or Firm*—Townsend and Townsend and Crew LLP

[57] ABSTRACT

A closure device (4) is used to seal an opening of a vessel (6), while providing access to the interior of the vessel. The closure device automatically releases gas and/or toxic vapor from the sealed vessel to protect the operator from harmful vapor without requiring the operator to manually actuate a valve or other mechanism prior to removing the vessel from the closure device. The closure device is constructed so the interior of the vessel can be pressurized while maintaining a pressure seal against the vessel opening, and the vessel can be cannulated without overpressurizing the vessel interior.

37 Claims, 8 Drawing Sheets

5,848,622

CLOSURE DEVICE AND METHOD FOR VENTING, CANNULATING AND PRESSURIZING A VESSEL

This is a Division of application Ser. No. 08/696,423, filed Aug. 13, 1996, the disclosure of which is incorporated by reference.

BACKGROUND OF THE INVENTION

The present invention relates generally to vessel closures and more specifically to a valve within a vessel closure for pressurizing, cannulating and/or venting the vessel while maintaining a pressure seal between the vessel interior and the environment.

Vessels for carrying out chemical and biochemical reactions must be capable of reliable isolation to prevent loss of any products of the reactions and to prevent unwanted or untimely mixing of different fluids. In addition, these sealed vessels must be readily accessible so that the operator can deliver or withdraw fluid to and from the vessels. For example, in organic reactions, such as those carried out in automated organic synthesizers, liquid organic solvents and reagents are often moved from threaded glass bottle reservoirs into reaction chambers. Typically, the bottles are each threadably coupled to a bottle cap or other vessel closure having one or more ports that fluidly connect the interior of the bottle with a pressurized gas source and the reaction vessel. Inert gas from the gas source, such as nitrogen, is forced through one of the ports to pneumatically displace the liquid within the interior of the bottle through another of the ports and along a liquid path to the reaction vessel. Since the organic solvents or reagents may be volatile, this liquid path is usually maintained in a dry inert atmosphere.

An important consideration regarding chemical processes is replacing or refilling the pressurized liquid bottles after the liquid has been transferred to the reaction vessel or to another storage vessel. Once the liquid has been displaced from the bottle, the bottle is typically disengaged from the cap so that the bottle can be cleaned and refilled or so that it can be replaced with another bottle. Removing the bottle from the cap, however, typically allows the pressurized gas to be expelled from the interior of the bottle. Toxic vapor resulting from mixing of the pressurized gas and the organic liquids may also escape from the bottle. This toxic vapor can be harmful to those using the bottle.

Numerous methods have been employed to prevent or at least inhibit toxic vapor from harming those individuals using bottles or other vessels during chemical processes. In one such method, for example, the entire synthesizing machine is placed in an evacuated hood and the operators are required to wear gloves. These requirements, however, are inconvenient, and they may not always be followed by the operators. Moreover, these methods do not insure that the operator is completely isolated from the toxic vapor escaping from the glass bottles.

As an additional precaution, manual valves have been incorporated into vessel closures to allow venting of the pressurized gas along an evacuated line prior to removing the bottle from the vessel closure. For example, one such method utilizes a three-way manual valve along the pressure line between the pressurized gas source and the vessel closure. Unfortunately, this method relies on the operator to correctly position the three-way valve prior to removing the bottle and, therefore, is not completely foolproof. Another method incorporates a solenoid-operated valve along the pressure line. This method, however, is relatively expensive, and it also requires the operator to manually actuate the appropriate valve.

For these and other reasons, it would be desirable to provide an improved vessel closure and method for automatically pressurizing and venting a vessel while maintaining an effective seal with the vessel to prevent toxic vapor and gases from escaping into the environment and potentially harming individuals that are performing the process.

SUMMARY OF THE INVENTION

The present invention provides a closure device and method for sealing an opening of a vessel, while providing access to the interior of the vessel. The invention also provides a method for automatically releasing pressure and/or toxic vapor from the sealed vessel, a method for pressurizing the interior of the vessel while maintaining a pressure seal against the vessel opening and a method for cannulating the vessel without overpressurizing the vessel interior.

The closure device of the present invention includes a cap removably coupled to a vessel, such as a threaded glass bottle, and a valve plug movably disposed within the cap for controlling fluid flow therethrough. The valve plug defines a sealing surface for sealing the opening of the vessel and a vent passage in communication with the vessel opening through the sealing surface. The valve plug is movable between a first position, where the vent passage communicates the opening with a vent port in the cap and a second position where the opening is fluidly isolated from the vent port. The valve plug automatically moves from the second position to the first position as the bottle is removed from the cap by the operator. In this manner, the valve plug will automatically provide a vent passage to release pressure and/or toxic vapor from the bottle before the operator completely disengages the bottle from the cap. Automatically venting vapor and gases from the bottle protects the operator from harmful fluids without requiring the operator to manually actuate a valve or other mechanism prior to removing the bottle.

In a specific configuration, the cap includes a body defining a through-hole for receiving the valve plug and inner threads for removably coupling the body to a threaded bottle. The cap further includes a manifold attached to the body and defining a vent port and a pressure port that can be coupled to an evacuated vent line and a source of pressurized gas, respectively. The valve plug is movable relative to the manifold and the body to fluidly couple the passage (and the interior of the bottle) with either the pressure or vent ports. The pressure and vent ports are configured such that, as the bottle is screwed into the cap, the valve plug automatically moves the valve plug passage from the first position in communication with the vent port, through the isolated second position, to a third position in communication with the pressure port. Likewise, as the bottle is unscrewed from the cap, the valve plug passage moves from the third position in communication with the pressure port, through the second position, to the first position in communication with the vent port.

The vessel closure preferably comprises means for biasing the valve plug away from the manifold toward the bottle to maintain a pressure seal against the bottle opening. In a preferred configuration, the biasing means is a spring positioned between an abutment surface within the manifold and the upper surface of the valve plug to bias the valve plug sealing surface against the top of the bottle. In this manner, the valve plug will effectively seal the bottle against internal gas pressure as the bottle is screwed or unscrewed from the cap.

The valve plug further includes a liquid port adapted for coupling to a source of liquid, such as an organic reagent source, and a liquid passage communicating the liquid port with the interior of the bottle. The liquid port is preferably fluidly coupled to the interior of the bottle throughout the entire movement of the valve plug (i.e., the first, second and third positions of the valve plug discussed above).

According to the method of the present invention, liquid is pneumatically forced into the bottle using a pressurized gas (i.e., cannulation). To accomplish this, the bottle is screwed into the cap until the valve plug is in the first position so that the vent port is fluidly coupled to the interior of the bottle. Liquid is then forced into the bottle through the liquid port while the internal gas is displaced through the vent port. The spring maintains a tight seal against the bottle opening while the liquid is delivered into the bottle interior.

To pressurize the bottle, the operator screws the bottle into the body of the cap, thereby moving the valve plug upward into the manifold. When the valve plug reaches the third position, the valve plug passage couples the pressure port with the interior of the bottle. Pressurized gas is then delivered through the pressure port and the valve plug passage into the interior of the bottle. As the valve plug is moved toward the manifold, the spring force against the valve plug increases to effectively seal the bottle against the increasing internal gas pressure.

When the bottle needs to be replaced or refilled, the operator unscrews the bottle from the body of the cap, thereby moving the valve plug away from the manifold. During this process, the valve plug moves into the first position to communicate the vent port with the interior of the bottle, allowing gas and toxic vapors to be released through the vent port to an evacuated vent line. The spring maintains the seal between the valve plug and the bottle until the bottle is removed from the cap. In this manner, substantially all of the gas and toxic vapors within the bottle will be vented through the evacuated vent line before the interior of the bottle is exposed to the environment.

Other features and advantages of the invention will appear from the following description in which the preferred embodiment has been set forth in detail in conjunction with the accompanying drawings.

DESCRIPTION OF THE SPECIFIC EMBODIMENTS

Figure 1:
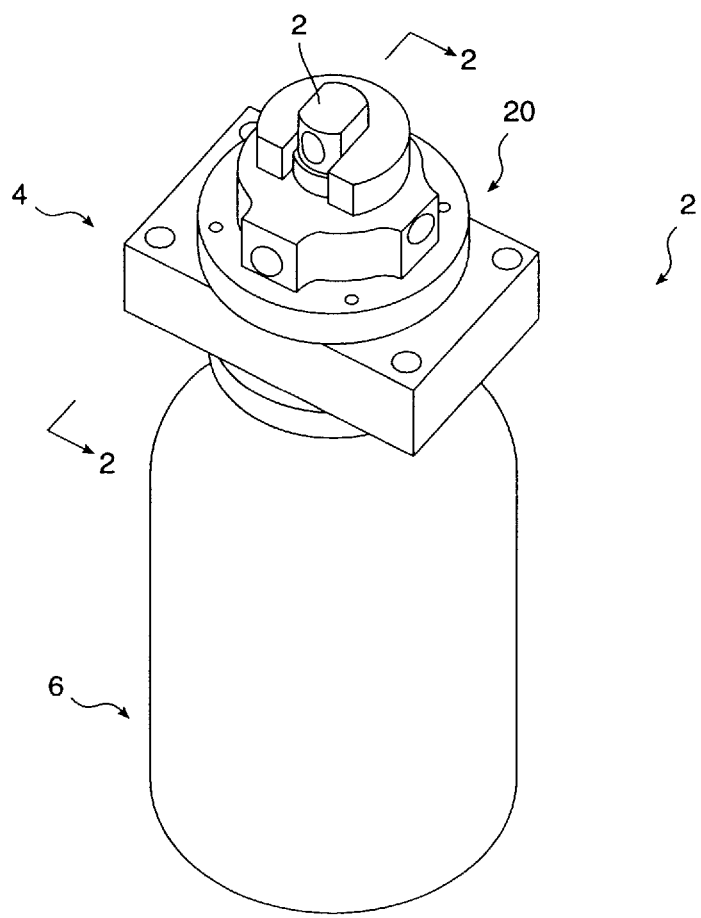
FIG. 1 is a perspective view of a representative fluid distribution system incorporating a closure device coupled to a bottle according to the principles of the present invention.
Figure 2:
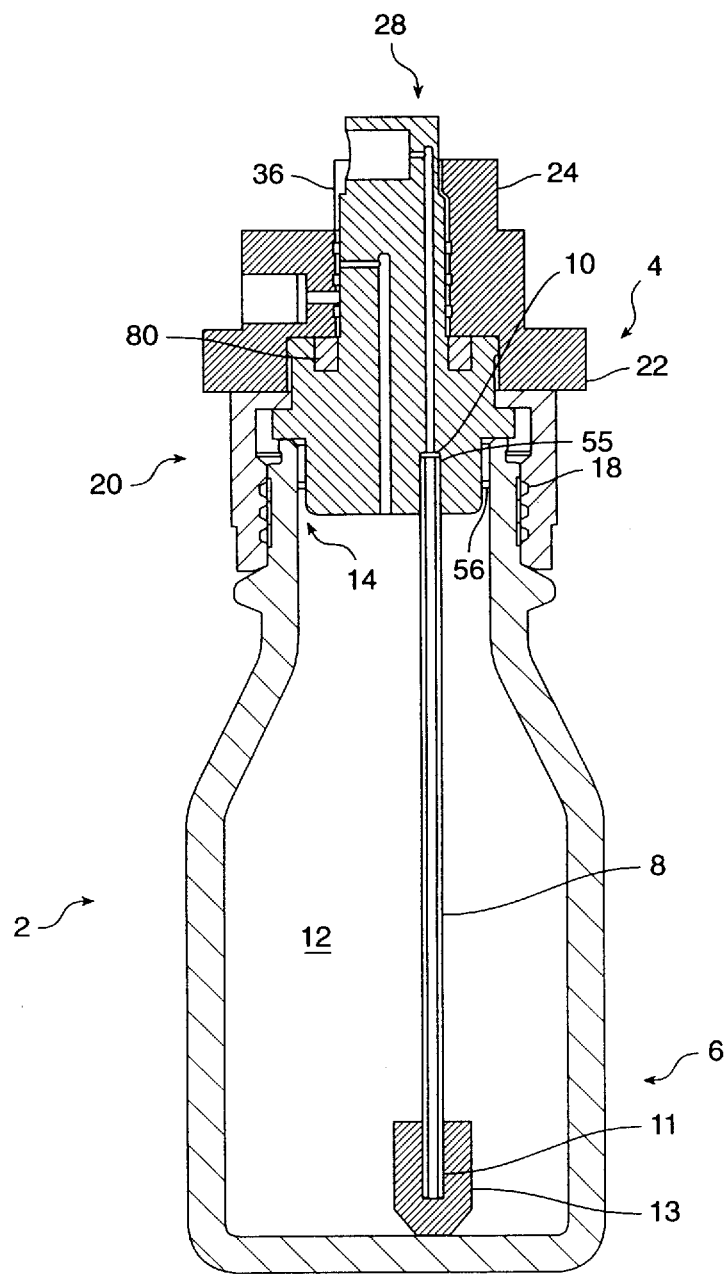
FIG. 2 is a cross-sectional view of the fluid distribution system of FIG. 1, taken along lines 2—2.
Figure 3:
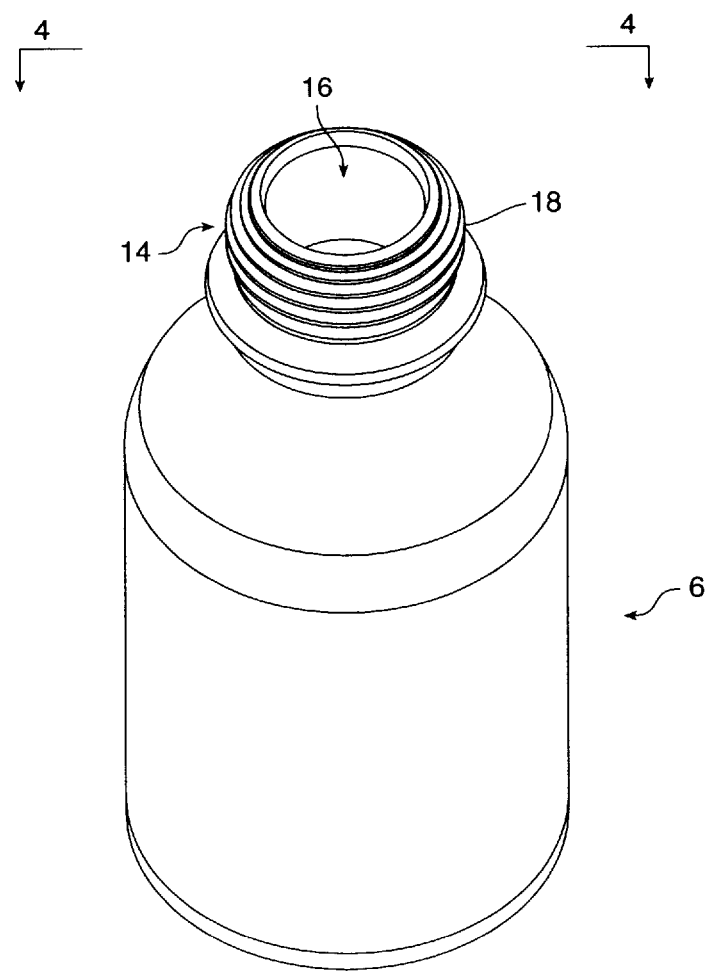
FIG. 3 is a perspective view of the representative bottle of FIG. 1, illustrating an annular seal according to the present invention.
Figure 4:
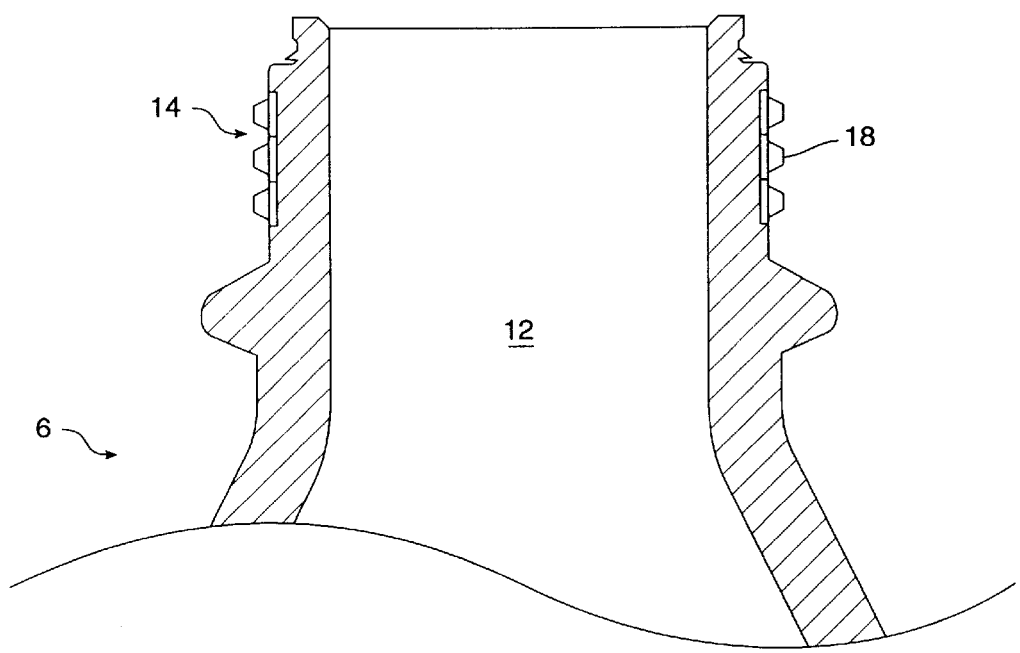
FIG. 4 is a partial, enlarged cross-sectional view of the bottle and seal of FIG. 3 taken along lines 4—4.

Referring to FIGS. 1 and 2, a representative fluid distribution system 2 incorporating a closure device 4 is illustrating according to the principles of the present invention. System 2 generally comprises a vessel, such as a bottle 6, removably coupled to closure device 4. In the representative embodiment, bottle 6 is a conventional or specialized glass bottle defining an interior 12 for housing liquids or gases and having an upper neck 14 defining an opening 16 and outer threads 18 around opening 16 for coupling bottle 6 to closure device 4. Bottle 6 further includes a conduit 8 having an upper port 10 extending above opening 16 and a lower port 11 near the bottom of bottle 6 for allowing liquid to flow to and from interior 12 of bottle. A filter 13, which preferably comprises a soft porous material such as Teflon®, plastic or stainless steel, is provided around lower port 11 to inhibit solid impurities from entering the fluid delivery valves.

In the representative embodiment, fluid distribution system 2 includes pressure, vent and liquid lines (not shown) coupling closure device 4 and bottle 6 with suitable sources of pressurized gas, liquid and the like. The liquid line is initially coupled to a source of liquid, such as a liquid organic solvent or a chemical reagent source, for filling interior 12 of bottle 6 through closure device 4 and opening 16. After bottle 6 is filled with the liquid, the liquid line will usually be decoupled from the liquid source and coupled to a suitable reaction vessel for transferring the liquid to the reaction vessel. The pressure line is preferably coupled to a source of dry inert gas, such as nitrogen, for pressurizing bottle 6 and for forcing the liquid from bottle 6 to the reaction vessel. The vent line is plumbed to a number of waste containers (not shown), which are vented into an evacuated hood. The slight vacuum in the hood creates a slight vacuum in the vent line for withdrawing gases and toxic vapors from bottle 6. The method of distributing fluids to and from bottle 6 through closure device 4 will be discussed in further detail below.

Referring to FIGS. 5–8, closure device 4 of the present invention will now be described in detail. Closure device 4 generally includes a cap 20 having a main body 22 and a manifold 24 coupled together by a plurality of fasteners 26, such as bolts, screws or the like. Main body 22 and manifold 24 are preferably fabricated of an inert material which is machinable and dimensionally stable under reaction conditions. Main body 22 and manifold 24 may also be formed from a single, integral part. In the preferred embodiment, manifold 24 preferably comprises a silica material, such as glass or ceramics, because these materials generally do not absorb chemicals from passing fluids. Body 22 may comprise a relatively hard, inert material, such as stainless steel or aluminum, or an elastomeric or plastic inert material, such as KEL-F, HDPE, PTFE, EPR, KAL-REZ, CHEM RAZ, polyethylene or the like.

Figure 5:
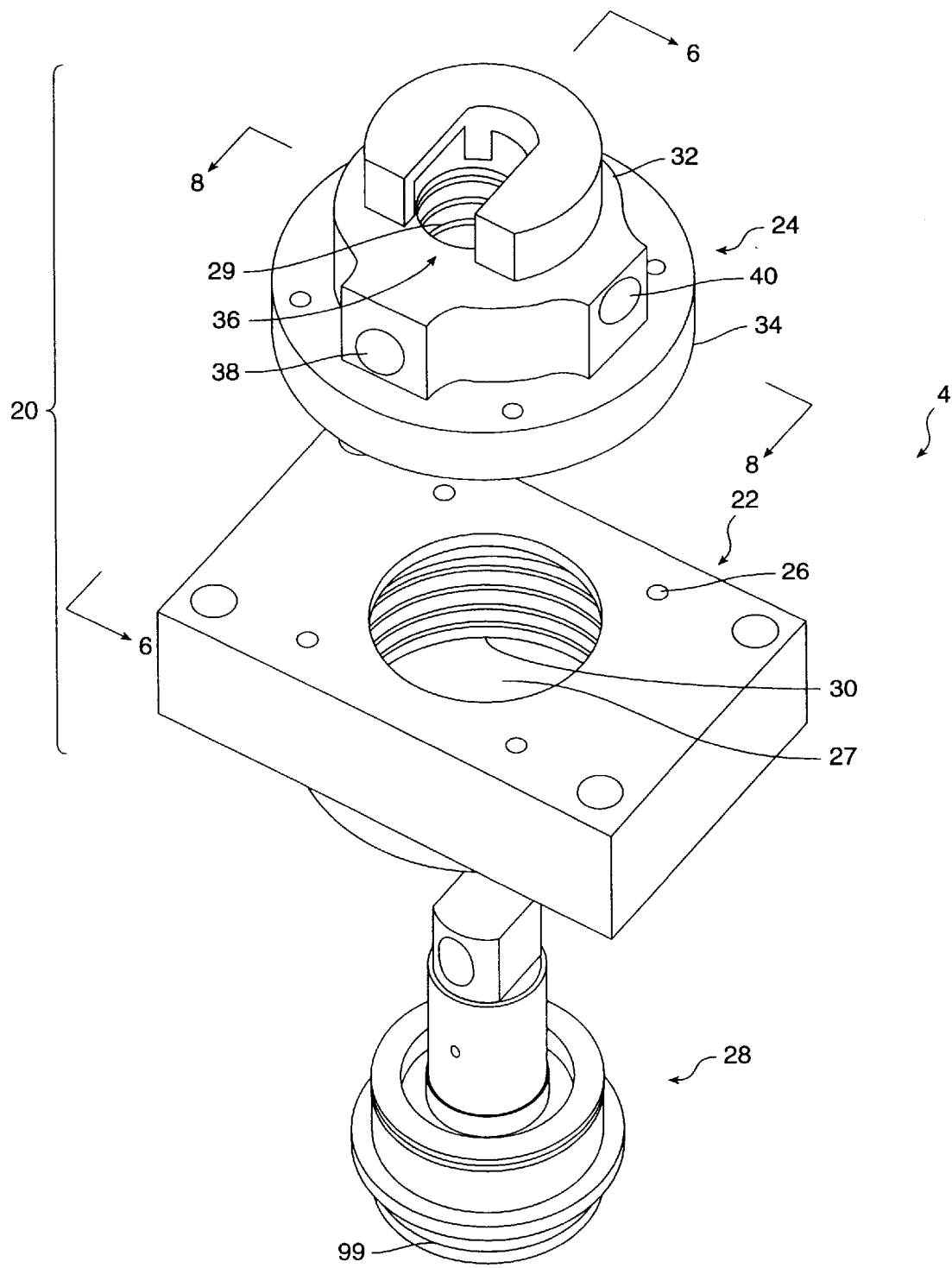
FIG. 5 is an exploded view of the closure device of FIG. 1.
Figure 6:
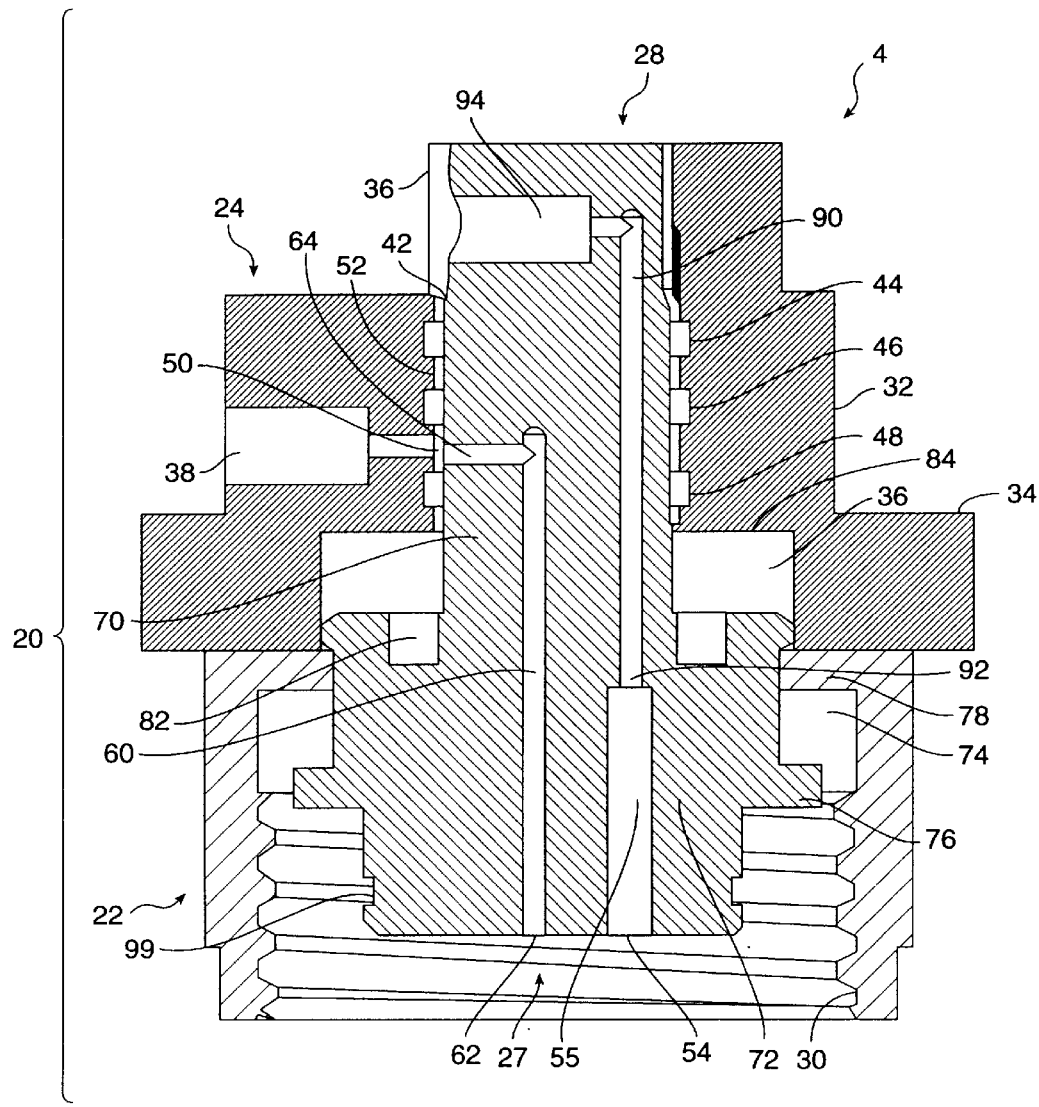
FIG. 6 is a cross-sectional view of the closure device of FIG. 5 taken along lines 6—6, illustrating a method of automatically venting gas from the bottle of FIG. 1.

As shown in FIGS. 5 and 6, main body 22 and manifold 24 define through-holes 27 and 29, respectively, for receiving a valve plug 28, which is movably disposed within through-holes 27, 29 to control fluid flow to and from the interior of bottle 6, as discussed in detail below. Main body 22 has an upper collar 78 extending inward into through-hole 27 for retaining valve plug 28 (discussed below). Body 22 also defines inner threads 30 around through-hole 27 for threadably coupling cap 20 to outer threads 18 on bottle 6. Friction between inner and outer threads 30, 18 resists the internal bottle pressure. As shown in FIG. 6, manifold 24 comprises an upper portion 32 and a lower flange 34, which is coupled to body 22 of cap 20. Upper portion 32 of manifold 24 defines a recess or opening 36 for allowing a fluid conduit, such as a liquid line, to be coupled to valve plug 28 (see FIG. 2). Upper portion 32 further defines a vent port 38 (FIGS. 6 and 7) and a pressure port 40 (FIG. 8) fluidly coupling the outer surface of manifold 24 with inner through-hole 29 (FIG. 5). In the representative embodiment, vent port 38 is coupled to a vent line and pressure port 40 is coupled to a source of pressurized gas.

Referring again to FIG. 6, upper portion 32 of manifold 24 has an inner diameter around through-hole 29 that is greater than the outer diameter of valve plug 28 to define an annular gap 42 therebetween. A plurality of sealing rings 44, 46, 48 are positioned within gap 42 to provide a number of discrete valve positions for distributing fluid flow between valve plug 28 and ports 38, 40. Preferably, manifold 24 includes three vertically spaced sealing rings 44, 46, 48 that define a first annular chamber 50 in communication with vent port 38 (FIG. 6) and a second chamber 52 in communication with pressure port 40 (FIG. 8). Sealing rings 44–48 create a radial seal between first chamber 50, second chamber 52 and the surrounding environment. Valve plug 28 defines a lower sealing surface 54 for sealing opening 16 of bottle 6 when the bottle is partially or completely screwed into through-hole 27 of body 22. Lower sealing surface 54 defines a hole 55 for receiving the upper portion of conduit 8 (FIG. 1), thereby providing a liquid path into and out of bottle 6 (as discussed below). Lower surface 54 of valve plug 28 preferably comprises a soft malleable material that conforms to neck 14 of bottle 6 around opening 16, such as Teflon®, fluoroethylene elastomers, such as Kalrez®, other suitable synthetic organic polymeric materials and the Like. The entire plug 28 may comprise a soft, malleable material, or the plug 28 may comprise a harder inert material, such as stainless steel, while the sealing surface 54 comprises the malleable material. In addition, an annular sealing ring 56 (FIG. 2) is positioned between a groove 99 (FIGS. 6–8) in the inner surface of bottle 6 and the outer surface of plug 28. Ring 56 is preferably a Teflon® encapsulated O-ring that provides an effective seal, particularly during removal of the plug 28 from the bottle 6.

Alternatively, bottle 6 may include an annular sealing ring (not shown) that snap fits over the upper lip of the bottle. The annular sealing ring may function as the only sealing material between bottle 6 and plug 28. In this configuration, the entire valve plug 28, including sealing surface 54, may comprise a harder material, such as stainless steel, because the sealing ring will effectively seal bottle 6 with plug 28. When plug 28 comprises Teflon®, the sealing ring also serves to protect sealing surface 54 from damage due to flaws in the glass bottle lip.

Figure 7:
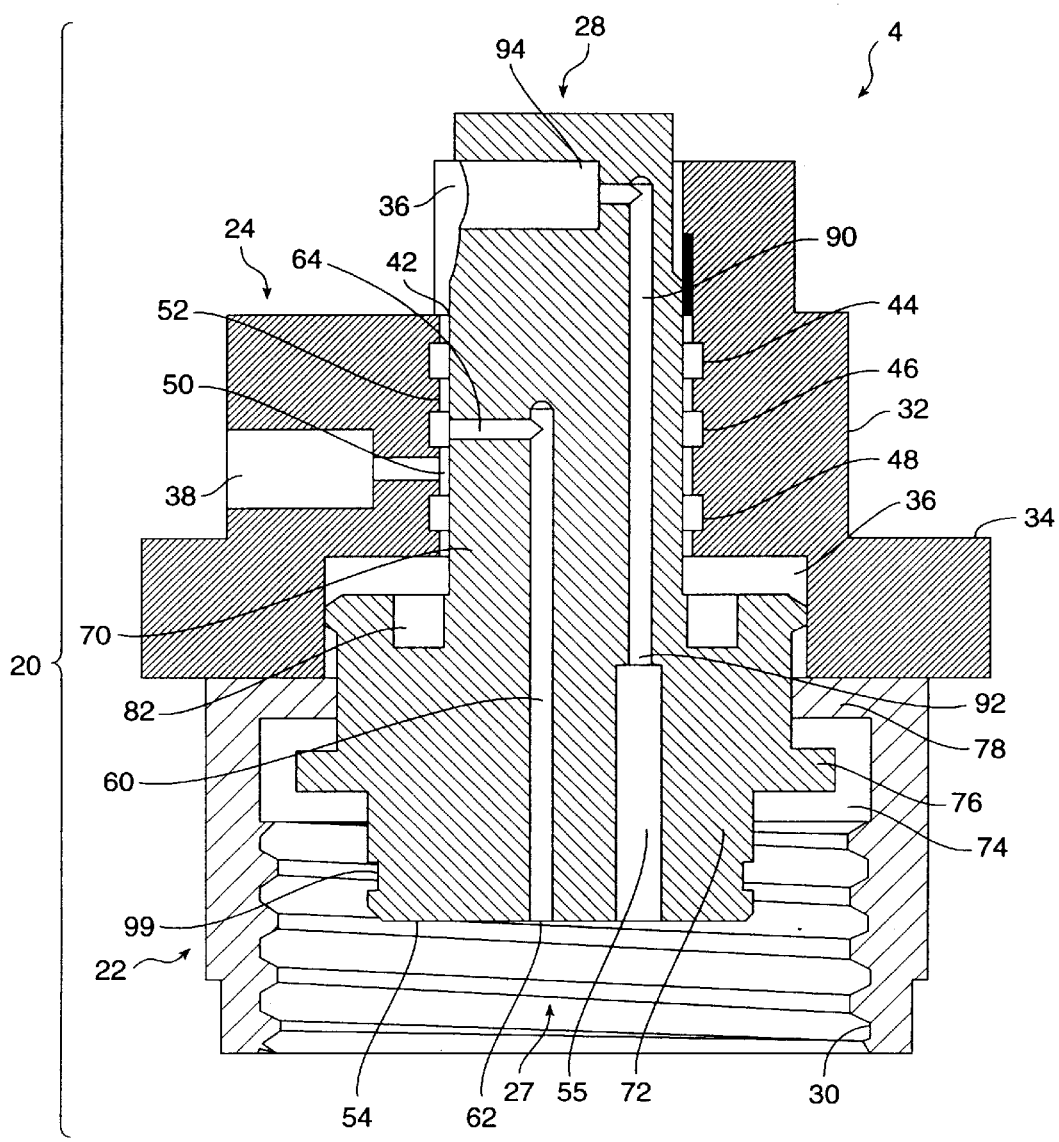
FIG. 7 is a cross-sectional view of the closure device of FIG. 5, illustrating the closure device in an intermediate position.
Figure 8:
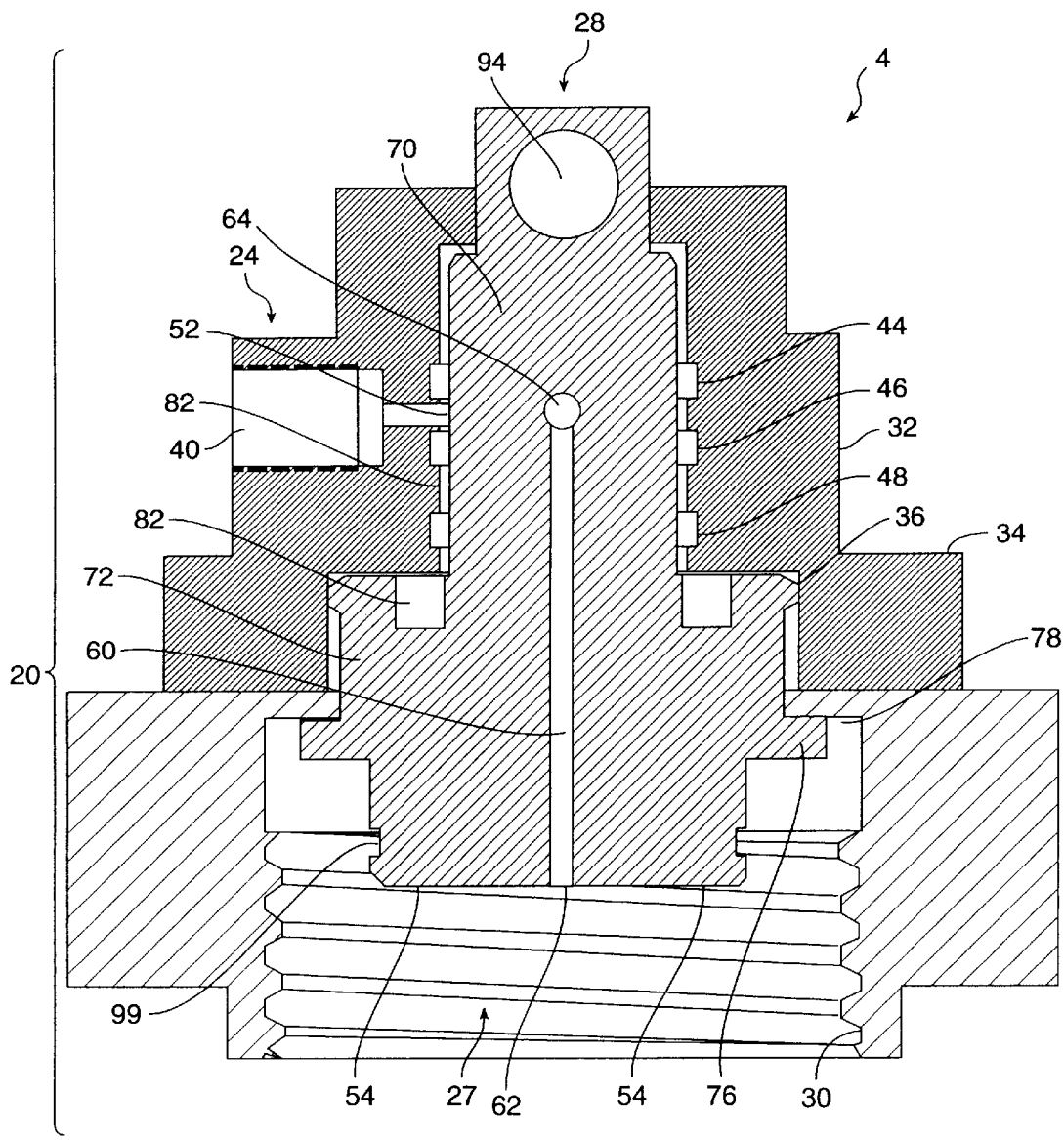
FIG. 8 is a cross-sectional view of the closure device of FIG. 5 taken along lines 8—8, illustrating a method of pressurizing the interior of the bottle of FIG. 1.

Referring to FIGS. 6–8, valve plug 28 defines a first passageway 60 having a lower port 62 extending through lower sealing surface 54 and an upper port 64 fluidly coupled to gap 42 for connecting the interior of bottle 6 with pressure and vent ports 40, 38. As bottle 6 is screwed into and out of body 22 of cap 20, neck 14 of bottle 6 moves valve plug 28 axially through through-holes 27, 29 so that upper port 64 moves into different positions relative to sealing rings 44–48. In the representative embodiment, valve plug 28 is axially movable between a first position (FIG. 6), in which upper port 64 of passageway 60 is located between rings 46, 48 to communicate vent port 38 with passageway 60 through first chamber 50, a second position (FIG. 7), in which upper port 64 is located opposite sealing ring 46 to fluidly isolate ports 38, 40 from passageway 60, and a third position (FIG. 8), in which upper port 64 is positioned between rings 44, 46 to connect pressure port 40 with passageway 60 through second chamber 52.

It should be understood that the present invention is not limited to the above configuration. For example, manifold 24 may comprise more than three sealing rings and additional fluid ports axially spaced from vent and pressure ports 38, 40, if desired. For example, additional ports may be used as a vacuum line to draw liquid into the bottle or vapor out of the bottle, or as a separate cannulation line. Alternatively, manifold 24 may comprise only two sealing rings on either side of a single port; i.e., a pressure port, a vent port or another suitable port.

As shown in FIG. 5, pressure and vent ports 40, 38 are preferably spaced circumferentially around manifold 24 from each other to minimize the height of plug 28 and manifold 20 (i.e., offsetting pressure and vent ports 40, 38 allows them to be vertically closer together). In the preferred configuration, vent port 38 is located directly across gap 42 from upper port 64 of passageway 60, as shown in FIG. 6. Vent port 38 is positioned close to upper port 64 to facilitate the discharge of gas and toxic vapors from interior 12 of bottle 6 through vent port 38 as the operator removes bottle 6 from cap 20. This effectively ensures that substantially all of the gas and/or toxic vapors will be vented from bottle 6 before the operator completely removes bottle 6 from cap 20, thereby exposing the interior of the bottle 6 to the environment. In addition, chamber 50 has a larger axial dimension than chamber 52 so that upper port 64 is in communication with chamber 50 longer than chamber 52. Preferably, chambers 50, 52 are arranged so that it takes about one half turn to move bottle 6 from a completely screwed in position (i.e., port 64 aligned with ring 44) to a position between chambers 50, 52 (port 64 aligned with ring 46), and a full turn to go from the position between chambers 50, 52 until the bottle seal is broken (i.e., port 64 aligned with ring 48). This provides more time to vent the gas and toxic vapors from bottle 6. The usual venting time is less than 5 seconds and preferably less than 2 seconds.

Pressure port 40 is preferably spaced sufficiently around manifold 24 from vent port 38 to avoid interference between the vent line and the pressure line. Usually, port 40 will be spaced at least 30° and preferably about 90° around manifold 24 from vent port 38. Thus, fluid must flow around a portion of annular chamber 52 to move between pressure port 40 and upper port 64 (FIGS. 5 and 7).

Valve plug 28 is biased downwardly toward bottle 6 so that lower surface 54 maintains an effective seal around opening 16. In this manner, valve plug 28 will seal interior 12 of bottle 6 when the bottle is only partially disposed within cap 20 so that the bottle remains sealed during venting, cannulation or pressurization (discussed below). In the preferred configuration, valve plug 28 comprises an upper stem 70 generally extending through upper portion 32 of manifold 24 and a lower base 72 disposed within an inner cavity 74 of flange 34 (see FIG. 6). Base 72 defines an annular flange 76 having a larger outer diameter than base 72 so that flange 76 engages upper collar 78 of body 22, thereby preventing valve plug 28 from further upward movement (FIG. 8). The means for biasing valve plug 28 preferably comprises a compression spring 80 (see FIG. 1) disposed within an annular cavity 82 (FIG. 6) in base 72 of plug 28 between base 72 and an abutment surface 84 of manifold 24. Spring 80 urges valve plug 28 downward toward bottle 6 to maintain the seal prior to complete engagement of bottle 6 with cap 20. In an exemplary embodiment, spring 80 comprises a crest-to-crest wave spring to help reduce the height of closure device 4.

As shown in FIG. 6, stem 70 of valve plug 28 preferably extends completely through manifold 24 so that it protrudes through opening 36 of upper portion 32. Valve plug 28 defines a second passageway 90 having a lower port 92 coupled to upper port 10 of conduit 8 and an upper, liquid port 94 communicating with opening 36 in the upper portion of manifold 24. Liquid port 94 is coupled to the liquid line for directing liquid to and from the interior of bottle 6. As shown in FIGS. 6–8, valve plug 28 is preferably designed so that liquid port 94 extends above manifold 24 within opening 36 in all three of the valve plug 28 positions described above.

The methods for venting, pressurizing and cannulating bottle 6 according to the present invention will now be described in detail. Bottle 6 will typically be used to temporarily store fluids, such as liquid organic solvents and reagents, prior to mixing the fluids in a reaction vessel (not shown). The operator initially screws bottle 6 into threads 30 of cap 20 to connect bottle 6 with fluid distribution system 2 and to seal interior 12 of bottle 6 from the environment. As bottle 6 is tightened into through-hole 27, neck 14 will automatically move valve plug 28 upward through through-holes 27, 29. To fill bottle 6 with a liquid (i.e., cannulation), bottle 6 is tightened until valve plug 28 is in the first position (FIG. 6), in which upper port 64 of first passageway 60 is located within first chamber 50 so that the interior of bottle 6 is connected with vent port 38. Liquid port 94 is attached to a liquid line, which is suitably coupled to the liquid source, and vent port 38 is attached to a vent line (FIG. 1). The liquid is then forced through liquid port 94 and second passageway 90 into conduit 8 by a pressurized gas attached to the liquid source. The liquid is directed through conduit 8 to the bottom of bottle 6, where it passes through filter 11 into the interior 12 of bottle 6. The internal gas or air in bottle 6 is displaced upwards by the liquid entering the bottom of bottle 6. This gas is directed through first passageway 60, where it is discharged out vent port 38 to the vent line. While the bottle is filled, spring 80 urges sealing surface 54 of valve plug 28 against opening 16 of bottle 6 to seal the interior of bottle 6 from the environment.

To pressurize the interior of bottle 6, bottle 6 is screwed in tighter until valve plug 28 is located in the third position (FIG. 8), in which upper port 64 of first passageway 60 is located within second chamber 52 to connect pressure port 40 with the interior of bottle 6. Once valve plug 28 is in the third position, the pressure line is coupled to pressure port 40 and pressurized gas is directed along the pressure line, through port 40 and passageway 60 into the interior of the bottle. The spring force against bottle 6 increases as valve plug 28 moves upward through manifold 24 to ensure that the pressurized bottle remains sealed. Bottle 6 is held in place within cap 20 by the friction force between cap threads 30 and bottle threads 18. Although liquid port 94 and second passageway 90 remain connected to interior 12 of bottle 6, the pressurized gas in the liquid line prevents the escape of fluids through passageway 90.

When the operator desires to transfer the liquid into the reaction vessel, the pressurized gas in the liquid line is removed to allow displacement of the liquid in bottle 6. The liquid line is then suitably detached from the liquid source and coupled to the reaction vessel. Gas is forced into bottle 6 along the pressure line, pressure port 40 and first passageway 60 to displace the liquid through filter 13 into conduit 8, where it is directed upwards into second passageway 90 and out liquid port 94 to the reaction vessel.

To replace or refill bottle 6, the operator disengages bottle 6 from cap 20. As valve plug 28 moves downward (due to the bias of spring 80, as shown in FIG. 1), upper port 64 moves into first chamber 50 to communicate vent port 38 with the interior of bottle 6 (FIG. 6). Pressurized gas and toxic vapors are automatically vented through passageway 60 and discharged out vent port 38 while spring 80 maintains a seal between plug 28 and bottle 6. Vent port 38 is positioned directly across from upper port 64 of passageway 60 so that substantially all of the gas and toxic vapors will be discharged through vent port 38 before the operator completely disengages bottle 6 from cap 20 and exposes the operator to these toxic vapors. With this configuration, closure device 4 automatically vents gas and toxic vapors from bottle 6 without requiring an action from the operator (other than unscrewing bottle 6 from cap 20).

Although the foregoing invention has been described in detail for purposes of clarity, it will be obvious that certain modifications may be practiced within the scope of the appended claims. For example, although closure device 4 is shown and described as part of a particular fluid distribution system 2, it is not intended to be limited in that manner. That is, closure device 4 may be used with a variety of chemical, bio chemical or other distribution systems, such as DNA and peptide synthesizers, chlorinating systems for swimming pools, petroleum refining systems and the like.

In addition, it should be noted that the closure device of the present invention may be modified for use with different types of vessels. For example, the vessel may have a closed top that is sealed with a soft material that can be penetrated with a needle or other sharp member. In one alternative configuration, the vessel will include a rubber, impermeable septum for sealing the top of the vessel. In this configuration, closure device 4 would incorporate fluid conduits or tubes having needle points for penetrating through the rubber septum into the interior of the vessel. One of the tubes would be sized to extend from passage 60 through the septum into the interior of the vessel for pressurizing or venting the vessel and the other tube would be sized to extend from passage 90 to a position near the bottom of the vessel for allowing liquid flow to and from the interior of the vessel.

The closure device of the present invention is also not limited to threadably coupling the bottle to the device. For example, the closure device may include a spring and lever mechanism for capturing the bottle lip. The lever could be manually actuated to move between the pressure, vent and release positions. The type of lever actuated mechanism would provide visible indication of mechanism position and could be easily adapted to a septa sealed type bottle design (i.e., twisting of the bottle relative to the needles would not be required). In addition, the type of lever actuated mechanism would not be limited by thread length, and the cap could be made of Teflon® or other similar inert materials.

What is claimed is:

1. A closure device for sealing an opening of a vessel comprising:

a cap adapted for being removably coupled to the vessel around the opening, the cap defining a port; and a valve plug disposed for biased axial movement within the cap for controlling fluid flow therethrough while said cap remains in contact with the vessel, the valve plug having a sealing surface for sealing the opening of the vessel and defining a passage coupling the opening of the vessel through the sealing surface, the valve plug being movable between a first position, where the passage directly couples the opening with the port, and a second position, where the opening is fluidly isolated from the port.

2. The closure device of claim 1 wherein the valve plug is configured to automatically move between the first and second positions when the vessel is coupled to and uncoupled from the cap.

3. The closure device of claim 1 wherein the cap includes an annular body adapted for being removably coupled to the vessel around the opening and a manifold attached to the body, wherein the port is a vent port located within the manifold for discharging fluid from the vessel.

4. The closure device of claim 3 further comprising a liquid port disposed within the valve plug for directing liquid to and from the vessel interior, the valve plug defining a second passage coupling the opening of the vessel with the liquid port in both the first and second positions of the valve plug.

5. The closure device of claim 4 wherein the manifold further defines a pressure port, the valve plug being movable to a third position in which the first passage couples the opening of the vessel with the pressure port, the pressure port being fluidly isolated from the first passage in the first and second positions of the valve plug, and the vent port being fluidly isolated from the first passage in the second and third positions.

6. The closure device of claim 5 wherein the body includes internal threads for threadably receiving the vessel, the valve plug being axially moved from the first position, through the second position, to the third position, as the vessel is screwed into the body.

7. The closure device of claim 6 further comprising means for biasing the valve plug toward the first position such that the valve plug moves from the third position, through the second position, to the first position, as the vessel is unscrewed from the body.

8. The closure device of claim 7 wherein the manifold defines an inner cavity, the biasing means comprising a spring positioned within the manifold cavity to urge the valve plug away from the manifold toward the vessel opening such that the sealing surface provides a pressure seal against the vessel opening in the first, second and third positions of the valve plug.

9. The closure device of claim 5 wherein the manifold defines a through-hole having an inner diameter greater than an outer diameter of a portion of the valve plug positioned within the through-hole so as to define a gap therebetween, the first passage of the valve plug having an opening in communication with the gap.

10. The closure device of claim 9 further comprising a plurality of axially spaced, annular seals disposed within the gap and defining annular chambers therebetween, the annular seals fluidly sealing the annular chambers from each other.

11. The closure device of claim 10 wherein the vent and pressure ports each have an opening coupled to one of the annular chambers for allowing fluid flow between the first passage and the vent and pressure ports, respectively, when the first passage is aligned with the respective annular chamber.

12. The closure device of claim 5 wherein the valve plug, the body and the manifold each comprise a chemically inert material.

13. The closure device of claim 1, wherein the cap includes internal threads for threadably receiving the vessel, the valve plug being axially moved from the first position, through the second position, to the third position, as the vessel is screwed into the cap.

14. The closure device of claim 1 wherein at least the sealing surface of the valve plug comprises a substantially malleable material for sealing the opening of the vessel.

15. The closure device of claim 14 wherein the valve plug comprises Teflon.

16. The closure device of claim 1 further comprising an annular sealing ring coupled adapted for attachment between the vessel and an outer surface of the valve plug, the annular sealing ring comprising a substantially malleable material.

17. The closure device of claim 16 wherein the valve plug comprises a relatively hard, chemically inert material.

18. A fluid distribution system comprising:
   a vessel defining an inner chamber and an opening;
   a closure device for sealing the vessel opening, the closure device comprising:
      a cap removably coupled to the vessel around the opening, the cap defining a port; and
      a valve plug disposed for biased axial movement within the cap for controlling fluid flow therethrough, the valve plug having a sealing surface for sealing the opening of the vessel and defining a passage coupled with the opening of the vessel through the sealing surface, the valve plug being movable between a first position, where the passage directly connects the opening with the port, and a second position, where the opening is fluidly isolated from the port;
   wherein the valve plug moves between the first and second positions when the vessel is coupled to and uncoupled from the cap.

19. The fluid distribution system of claim 18 further comprising an evacuated vent line coupled to the port to allow venting of fluid from the vessel interior when the valve plug is in the first position.

20. The fluid distribution system of claim 18 further comprising a liquid port disposed within the valve plug and a liquid line coupled to the liquid port, the valve plug defining a second passage coupling the opening of the vessel with the liquid port for directing liquid to and from the vessel interior.

21. The fluid distribution system of claim 18 further comprising a pressure line adapted for coupling to a source of pressurized gas, the cap further defining a pressure port, the valve plug being movable to a third position in which the first passage couples the opening of the vessel with the pressure port to deliver pressurized gas to the vessel interior, the pressure port being fluidly isolated from the first passage in the first and second positions of the valve plug, and the vent port being fluidly isolated from the first passage in the second and third positions.

22. The closure device of claim 21 wherein the cap includes internal threads for threadably receiving the vessel, the valve plug being axially moved from the first position, through the second position, to the third position, as the vessel is screwed into the cap.

23. The closure device 21 further comprising means for biasing the valve plug toward the first position such that the valve plug moves from the third position, through the second position, to the first position, as the vessel is unscrewed from the body.

24. A closure device for sealing an opening of a vessel comprising:
   a cap adapted for being removably coupled to the vessel around the opening, the cap defining a first port and a second port; and
   a valve plug disposed within the cap for controlling fluid flow therethrough, the valve plug having a sealing surface for sealing the opening of the vessel and defining a passage coupling the opening of the vessel through the sealing surface, wherein the valve plug and cap are rotatable relative to one another;

wherein said cap is movable to a first position where the first port is open and the second port is closed, and wherein the cap is movable to a second position where the first port is closed and the second port is open.

25. A closure device for sealing an opening of a vessel comprising:

a cap adapted for being removably coupled to the vessel around the opening, the cap defining a first port and a second port; and a valve plug disposed within the cap for controlling fluid flow therethrough, the valve plug having a sealing surface for sealing the opening of the vessel and defining a passage coupling the opening of the vessel through the sealing surface, wherein the valve plug and the cap are rotatable relative to one another;

wherein said cap is movable to a first position where the first port is open and the second port is closed, wherein the cap is movable to a second position where the first port is closed and the second port is open, and wherein the valve plug is configured to automatically move between the first and second positions when the vessel is coupled to and uncoupled from the cap.

26. A closure device for sealing an opening of a vessel comprising:

a cap adapted for being removably coupled to the vessel around the opening, the cap defining a port; and a valve plug disposed for biased axial movement within the cap for controlling fluid flow therethrough, the valve plug having a sealing surface for sealing the opening of the vessel and defining a passage coupling the opening of the vessel through the sealing surface, the valve plug being movable between a first position, where the passage directly couples the opening with the port, and a second position, where the opening is fluidly isolated from the port;

wherein the cap includes an annular body adapted for being removably coupled to the vessel around the opening and a manifold attached to the body, wherein the port is a vent port located within the manifold for discharging fluid from the vessel.

27. The closure device of claim 26 further comprising a liquid port disposed within the valve plug for directing liquid to and from the vessel interior, the valve plug defining a second passage coupling the opening of the vessel with the liquid port in both the first and second positions of the valve plug.

28. The closure device of claim 27 wherein the manifold further defines a pressure port, the valve plug being movable to a third position in which the first passage couples the opening of the vessel with the pressure port, the pressure port being fluidly isolated from the first passage in the first and second positions of the valve plug, and the vent port being fluidly isolated from the first passage in the second and third positions.

29. The closure device of claim 28 wherein the body includes internal threads for threadably receiving the vessel, the valve plug being axially moved from the first position, through the second position, to the third position, as the vessel is screwed into the body.

30. The closure device of claim 29 further comprising means for biasing the valve plug toward the first position such that the valve plug moves from the third position, through the second position, to the first position, as the vessel is unscrewed from the body.

31. The closure device of claim 30 wherein the manifold defines an inner cavity, the biasing means comprising a spring positioned within the manifold cavity to urge the valve plug away from the manifold toward the vessel opening such that the sealing surface provides a pressure seal against the vessel opening in the first, second and third positions of the valve plug.

32. The closure device of claim 31 wherein the manifold defines a through-hole having an inner diameter greater than an outer diameter of a portion of the valve plug positioned within the through-hole so as to define a gap therebetween, the first passage of the valve plug having an opening in communication with the gap.

33. The closure device of claim 32 further comprising a plurality of axially spaced, annular seals disposed within the gap and defining annular chambers therebetween, the annular seals fluidly sealing the annular chambers from each other.

34. The closure device of claim 33 wherein the vent and pressure ports each have an opening coupled to one of the annular chambers for allowing fluid flow between the first passage and the vent and pressure ports, respectively, when the first passage is aligned with the respective annular chamber.

35. A fluid distribution system comprising:

a vessel defining an inner chamber and an opening;

a closure device for sealing the vessel opening, the closure device comprising:
a cap removably coupled to the vessel around the opening, the cap defining a port; and
a valve plug movably disposed within the cap for controlling fluid flow therethrough, the valve plug having a sealing surface for sealing the opening of the vessel and defining a passage coupled with the opening of the vessel through the sealing surface, the valve plug being movable between a first position, where the passage connects the opening with the port, and a second position, where the opening is fluidly isolated from the port;
wherein the valve plug moves between the first and second positions when the vessel is coupled to and uncoupled from the cap; and a pressure line adapted for coupling to a source of pressurized gas, the cap further defining a pressure port, the valve plug being movable to a third position in which the first passage couples the opening of the vessel with the pressure port to deliver pressurized gas to the vessel interior, the pressure port being fluidly isolated from the first passage in the first and second positions of the valve plug, and the vent port being fluidly isolated from the first passage in the second and third positions.

36. The closure device of claim 35 wherein the cap includes internal threads for threadably receiving the vessel, the valve plug being axially moved from the first position, through the second position, to the third position, as the vessel is screwed into the cap.

37. The closure device 35 further comprising means for biasing the valve plug toward the first position such that the valve plug moves from the third position, through the second position, to the first position, as the vessel is unscrewed from the body.

* * * * *